No. 852,051. PATENTED APR. 30, 1907.
A. BAUER.
THILL COUPLING.
APPLICATION FILED JULY 12, 1906.

Witnesses
J. C. Simpson
J. B. MacNab

Inventor
Alois Bauer.

Attorneys

UNITED STATES PATENT OFFICE.

ALOIS BAUER, OF CLEVELAND, MINNESOTA.

THILL-COUPLING.

No. 852,051.  Specification of Letters Patent.  Patented April 30, 1907.

Application filed July 12, 1906. Serial No. 325,899.

*To all whom it may concern:*

Be it known that I, ALOIS BAUER, a citizen of the United States, residing at Cleveland, in the county of Lesueur, State of Minnesota, have invented certain new and useful Improvements in Thill-Couplings; and I do hereby declare the following to be a full, clear, and exact description of the invention, such as will enable others skilled in the art to which it appertains to make and use the same.

This invention relates to thill couplings, and has for its object to provide a device of this nature, which will effectually cushion the jolt occasioned by the sudden starting of a vehicle, not only as regards the occupants of the same, but also the horse.

Furthermore, the device is designed to insure steady running of the vehicle at all times, and to ease the strain upon the neck of the horse drawing the same.

The invention, broadly speaking, resides in the provision of a bracket having spaced upstanding end portions, a rod mounted for sliding movement in the said end portions, a thill connected with the rod, and springs disposed upon the rod intermediate its end portions and the thill, the provision of a pair of springs serving to cushion the movement of the thill in each direction.

Figure 1:
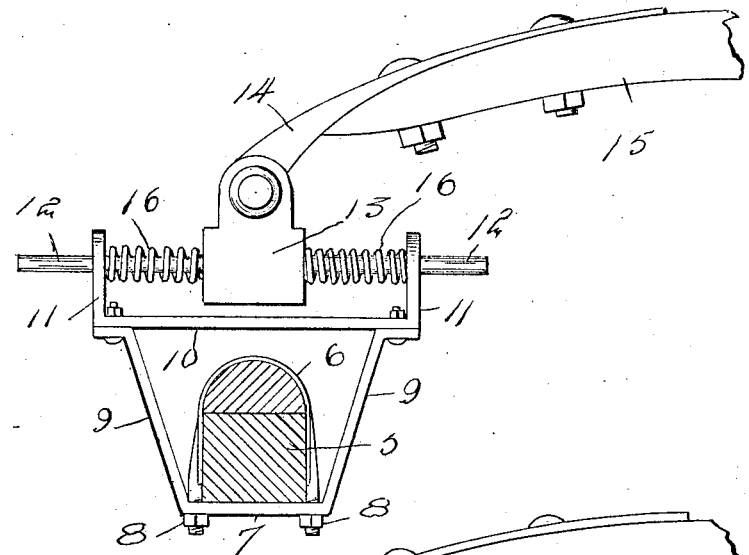
Figure 2:
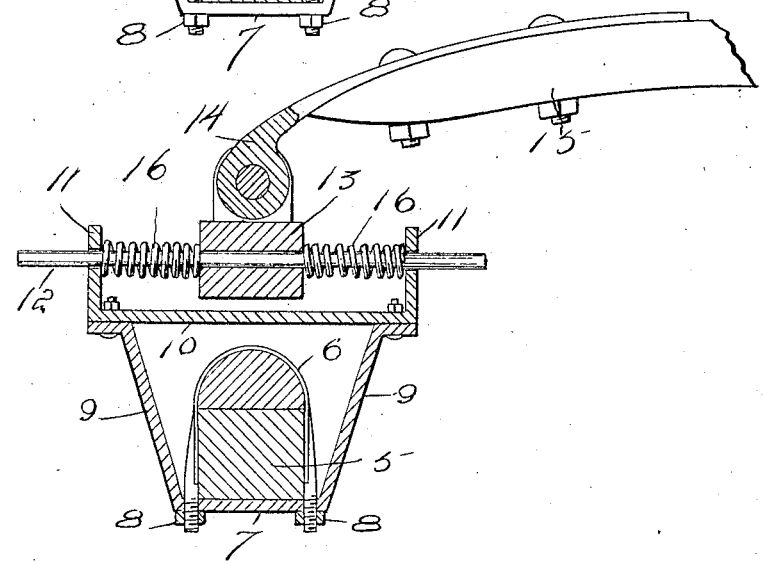
Figure 3:
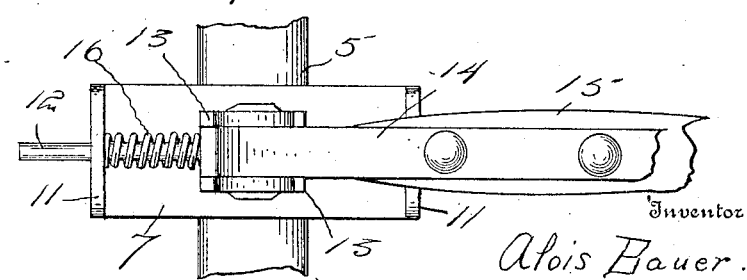

In the accompanying drawings—Figure 1 is a side elevation of the device in use. Fig. 2 is a detail vertical longitudinal sectional view therethrough, and, Fig. 3 is a plan view thereof.

Referring more specifically to the drawings, the numeral 5 denotes the front axle of a vehicle, and 6 a clip which is engaged over the axle and at its ends through the connecting portion 7 of a bracket, which is held by means of the clip and nuts 8 engaged upon the ends thereof, in position upon the axle 5. The said bracket includes upwardly diverging arms 9 which are bolted or otherwise secured at their upper ends to the under side of a plate 10 and in this manner supports the same above the axle. The ends of the plate are upturned, as at 11, and provided with alining apertures through which is slidably engaged a rod 12, the ends of which extend beyond the adjacent upturned portions of the plate. A sleeve 13 is welded or otherwise secured upon the rod 12 intermediate its ends, and secured to the sleeve is a thill iron 14 in which is secured the rear end of a thill 15.

Engaged upon the rod 12 intermediate the sleeve 13 and the upturned ends of the plate 10 are springs 16 which, as will be readily understood, cushion the forward and rearward movement of the thill and the rod 12 thereby preventing jars or jolts and insuring steady travel of the vehicle in connection with which the device is used.

What is claimed, is—

The combination with a vehicle axle and a thill, of a clip engaged with the axle, a bracket supported by the clip, a rod arranged for reciprocatory movement in the bracket, a sleeve fixedly carried by the rod and including spaced ears which are formed integral with the sleeve, and between which the thill is received, and springs arranged upon the rod and bearing against the ends of the sleeve and the corresponding ends of the bracket.

In testimony whereof, I affix my signature, in presence of two witnesses.

ALOIS BAUER.

Witnesses:
W. O. SHUEY,
R. B. JAEGER.